United States Patent

[11] 3,634,725

| [72] | Inventor | Conrad H. Biber |
| | | Needham, Mass. |
| [21] | Appl. No. | 671,413 |
| [22] | Filed | Sept. 28, 1967 |
| [45] | Patented | Jan. 11, 1972 |
| [73] | Assignee | Polaroid Corporation |
| | | Cambridge, Mass. |

[54] MODULATED ELECTRONIC FLASH CONTROL
16 Claims, 7 Drawing Figs.

[52] U.S. Cl............................................. 315/241 P,
95/11.5 R, 315/125, 315/208, 315/245, 315/293,
315/310, 315/241 S
[51] Int. Cl............................................. H05b 41/32
[50] Field of Search............................................. 315/209,
209 CD, 224, 238, 122, 125, 126, 240, 245, 293,
310, 241, 241 S, 241 P; 340/331, 332, 366, 378;
95/11.5 R

[56] References Cited
UNITED STATES PATENTS
| 2,917,668 | 12/1959 | Witterson.................... | 315/171 |
| 3,375,403 | 3/1968 | Flieder........................ | 315/240 |
| 3,422,308 | 1/1969 | Sullivan....................... | 315/172 |
| 526,147 | 9/1894 | Edison......................... | 313/7 X |

*Primary Examiner*—John W. Huckert
*Assistant Examiner*—William D. Larkins
*Attorneys*—Brown and Mikulka and William D. Roberson ABSTRACT: This specification discloses a photoflash circuit for modulating the flash output of a photoflash device in accordance with the focus setting of a camera. The circuit includes an energy storage device, a triggering circuit to supply the energy to the photoflash device and an energy dissipating resistor in series with the flash tube to limit its light output. The circuit includes a control means comprising an electronic switching means to shunt the energy dissipating resistor out of the photoflash device circuit to increase the light output from the flash tube and a timing circuit to produce a triggering signal to energize the switching means. The timing circuit includes an adjustable resistor mechanically coupled to the camera focus controls for varying the triggering time of the switching means and the time the resistor remains in the flash tube circuit.

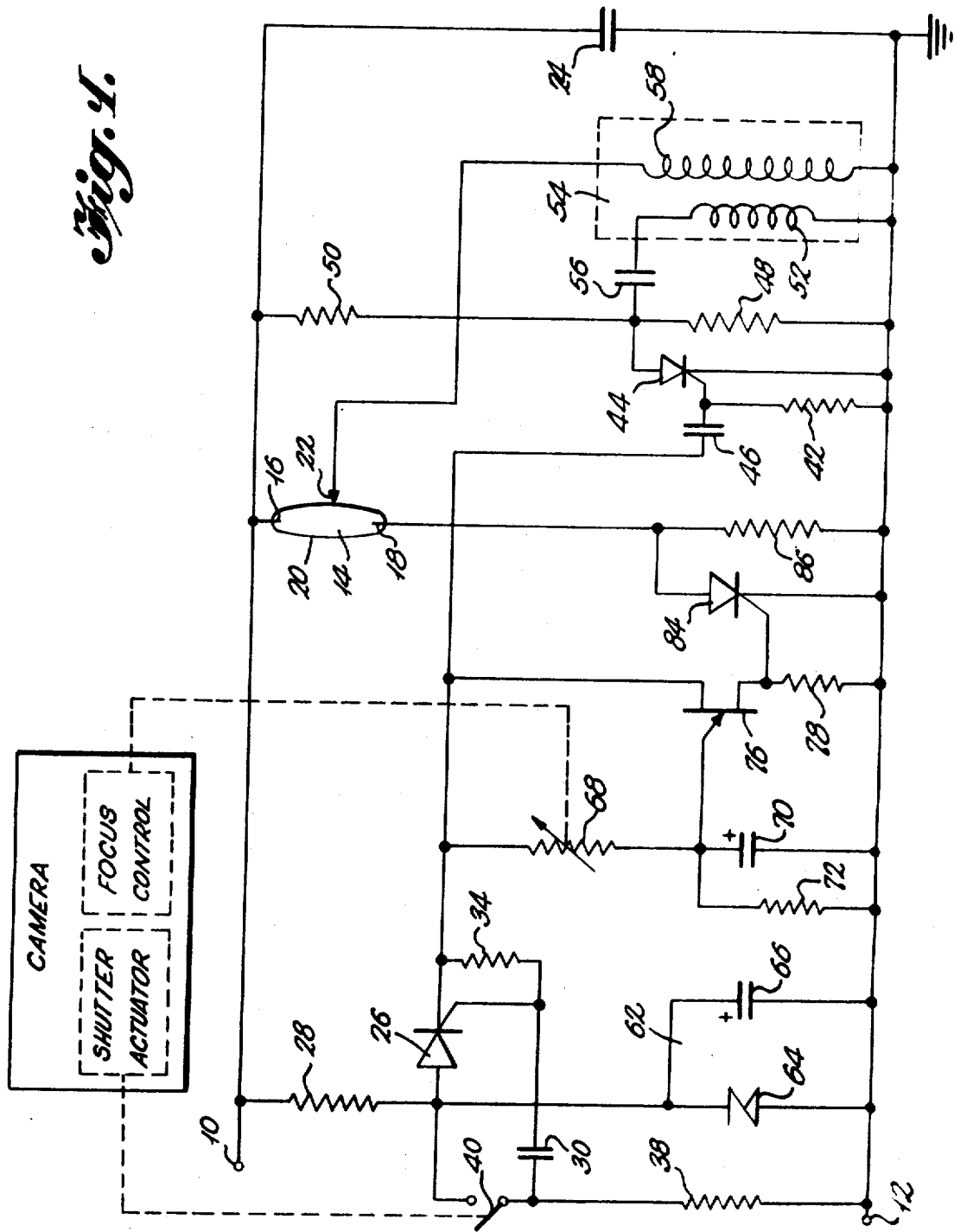

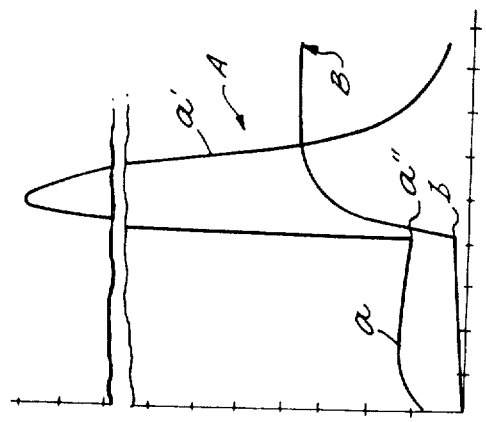
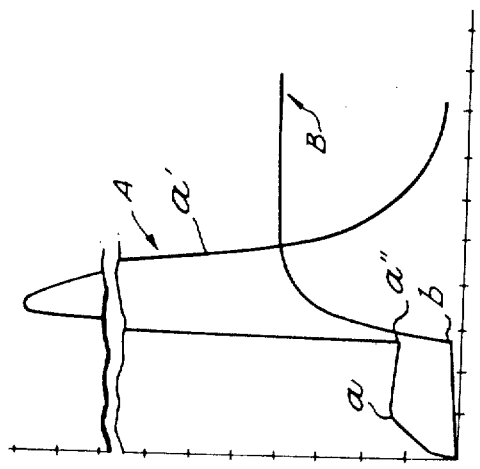
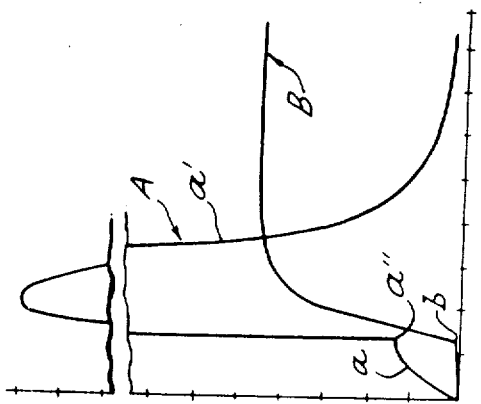
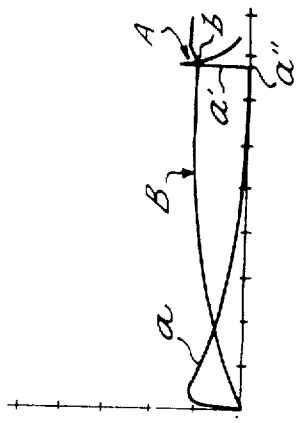
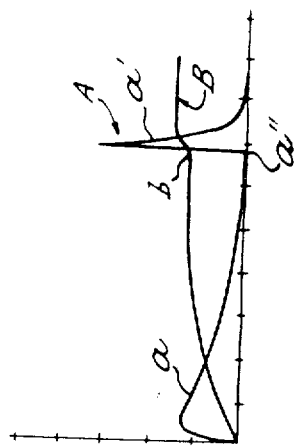
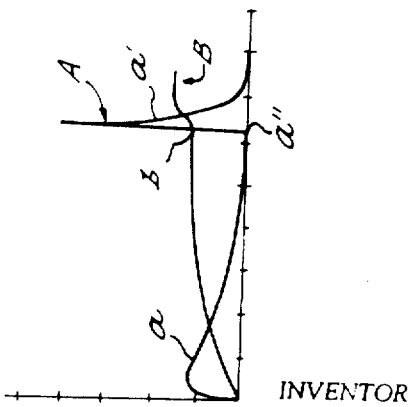
INVENTOR
Conrad H. Biber
BY Brown + Mikulka and
Richard L. Aitken
ATTORNEYS

MODULATED ELECTRONIC FLASH CONTROL

BACKGROUND OF THE INVENTION

The present invention relates to a photoflash circuit and more particularly to a circuit for modulating the output flash of a photoflash light in accordance with the focus setting of a camera.

Various electronic photoflash circuits have been developed to produce flashes of different intensities or durations for different exposure situations. These circuits eliminate the problems of adjusting the camera controls to provide a proper exposure with a constant light source such as is available from a conventional photoflash system.

One such electronic photoflash circuit includes a shunting means to terminate the flash at a preset time to provide the proper illumination level for a given exposure. The shunting means is fired by means of a switching circuit which is activated to conduct after a predetermined time interval established by the setting of a resistance-capacitance timing circuit.

In photoflash circuits of the type described above which use a shunting means to terminate the flash, silicon-controlled rectifiers would appear to provide a practicable means for shunting the photoflash output. With the silicon-controlled rectifier that is connected in shunt across the flash tube in the untriggered state, the tube receives all of the flash energy and it produces a high intensity output. When the silicon-controlled rectifier is triggered into conduction, the photoflash tube is shunted and the light output is terminated. Some difficulty has been encountered in this circuit arrangement because all of the energy in the charged capacitor is dissipated in the junction of the silicon-controlled rectifier when it is triggered and silicon-controlled rectifiers are not designed to be high-energy dissipating devices. Because of this difficulty of energy dissipation an inductor or other protective circuitry is needed for the silicon-controlled rectifier. Similar difficulties are also encountered when other electronically triggered shunting devices are used.

SUMMARY OF THE INVENTION

The present invention relates to a photoflash circuit adapted to produce a light flash varying in energy level in accordance with the desired photographic exposure. The circuit is designed to overcome the problem of energy dissipation at the silicon-controlled rectifier junction by a novel circuit configuration. A resistor is placed in series with the photoflash tube and a silicon-controlled rectifier is connected in parallel across the resistor. With the resistor in the circuit, the energy from the flash output storage capacitor is dissipated in the resistor and a flash of low intensity is produced. When the silicon-controlled rectifier is triggered into conduction the resistor is shunted out of the flash tube circuit and a high-output intensity is produced by the flash tube. Since the silicon-controlled rectifier is in series with the flash tube, the flash energy is dissipated across the flash tube rather than in the silicon-controlled rectifier and the need for an inductor or other protective circuitry for the silicon-controlled rectifier is eliminated. The circuit also avoids leakage through the silicon-controlled rectifier during the idle periods since it is in series with the flash tube.

Triggering of the silicon-controlled rectifier is controlled in accordance with a preset timing circuit, whose charging time is adjustable by means of the camera focus controls so that the energy output level of the flash lamp is made proportional to the camera-to-subject distance. When maximum light output from the flash tube is desired, the timing circuit is adjusted by the focus controls to cause the controlled rectifier to trigger simultaneously with the firing of the flash tube to completely short out the output resistor in series with the flash tube. When less light from the flash tube is required, the timing circuit is regulated to trigger the controlled rectifier after a delay period so that a portion of the energy from the output storage capacitor is dissipated by the resistor, resulting in less light output from the flash tube. By varying the delay provided by the timing circuit with the camera focus, the amount of light output from the flash tube is varied to automatically provide the correct exposure.

Among the objects of this invention are the provision of a photoflash circuit to produce light flashes the energy level of which is controlled in accordance with the proper exposure level; the provision of a photoflash circuit to produce light flashes, the energy level of which, is regulated by the focus controls of a camera; the provision of a photoflash circuit to produce a light flash output, the energy level of which is regulated by a switching circuit including a timing means and a triggering device; and the provision of a photoflash circuit to produce a light flash output, the energy level of which is regulated by dissipating a predetermined amount of energy in a resistor in series with the flash tube.

Other objects and advantages of this invention will become more PVA when taken in conjunction with the accompanying drawings.

BRIEF DESCRIPTION OF THE DRAWINGS

FIG. 1 is a schematic wiring diagram of a photoflash circuit according to the invention; and FIGS. 2–7 are graphs showing the flash light characteristics of the photoflash circuit of the invention.

DESCRIPTION OF THE PREFERRED EMBODIMENT

As shown in FIG. 1 an electronic flash producing circuit is adapted to be connected to a high-voltage source of supply by means of PVA, 10 and 12. The supply may be a battery operated converter (not shown) to produce a high-voltage output of approximately 500 volts to power the flash circuit. A flash tube 14 includes electrodes 16 and 18, which are disposed in a gaseous medium such xenon within a transparent quartz envelope 20, and a trigger electrode 22. A storage capacitor 24, connected across the high-voltage input terminals 10 and 12, powers the flash tube 14. The circuit for firing the flash tube 14 includes a silicon-controlled rectifier 26, the anode of which is coupled to the high positive voltage input terminal 10 through a 1.5-megohm resistor 28. A switch 40, in series with a 100-kilohm resistor 38 is connected between the anode of the silicon-controlled rectifier 26 and the ground terminal 12. The switch 40 is operated by the shutter actuator of the associated camera and is closed automatically when the shutter is actuated. A 0.1-microfarad capacitor 30 is connected between the gate of the silicon-controlled rectifier 26 and the junction between the switch 40 and the resistor 38. A 1-kilohm resistor 34 is connected between the cathode and gate electrode of the silicon-controlled rectifier to prevent unwanted triggering of the silicon-controlled rectifier by circuit transients. The cathode of the silicon-controlled rectifier 26 is connected if the gate electrode of a silicon-controlled rectifier 44 through a 0.1-microfarad capacitor 46. A 1-kilohm resistor 42, which is connected between the gate electrode and ground of the silicon-controlled rectifier 44 prevents unwanted triggering of the silicon-controlled rectifier 44 by circuit transients. A voltage divider circuit, formed by 1.5-megohm resistors 48 and 50 is connected across the power supply terminals 10 ans 12. The silicon-controlled rectifier 44 is connected in shunt across resistor 48. One side of the primary winding 52 of a triggering transformer 54 is connected to the junction between resistors 48 and 50 by 0.22-microfarad capacitor 56. The other side of the primary winding 52 is connected to ground terminal 12. Secondary winding 58 of the triggering transformer 54 is coupled between the triggering electrode 22 of the flash tube 14 and ground terminal 12.

The energy level of the flash is controlled by a flash modulation circuit which is powered by means of a 20-volt 60°circuit 62 comprising a zener diode 64 and 100-microfarad storage capacitor 66 connected in parallel between the anode of the silicon-controlled rectifier 26 and the ground terminal 12. The zener diode is operated in its breadkown region to provide 20 volts across the capacitor 66 and at the anode of the silicon-controlled rectifier 26. The flash modulation circuit comprises a timing circuit formed of a variable resistor 68 of about 5 kilohms and a 40-microfarad capacitor 70 connected in series between the cathode of the silicon-controlled rectifier 26 and ground terminal 12 with a 150-kilohm resistor 72 shunting the capacitor 70. The junction between the resistor 68 and the capacitor 70 is connected to the emitter of a unijunction transistor 76, which is connected in series with PVA, 47-ohm resistor 78 between the cathode of the silicon-controlled rectifier 26 and the ground terminal 12. The junction between the transistor 76 and the resistor 78 is directly coupled to the gate electrode of a silicon-controlled rectifier 84, which shunts a 15-ohm, 10-watt, energy-dissipating resistor 86 connected in series with the flash tube 14.

In operation of the photoflash circuit, with the input terminals 10 and 12 connected to a PVA, source of supply, the flash storage capacitor 24 is charged to its operating potential of 500 volts. The voltage on storage capacitor 24 is not sufficient in itself to cause an electrical gaseous discharge through the flash tube 14, except when the trigger electrode 22 is energized. At the same time, the storage capacitor 66 of the modulation supply circuit 62 is charged to its operating value of 20 volts through resistor 28. In addition, the triggering capacitor 56 is precharged from the voltage divider circuit of resistors 48 and 50 to 250 volts. With the silicon-controlled rectifier 26 in the nonconducting condition, current does not flow in the flash tube firing circuit and the flash tube 14 remains deenergized. Also the capacitor 70 of the timing circuit will be in discharged condition. Closing of the switch 40 applies a gating signal through capacitor 30 to the gate electrode of silicon-controlled rectifier 26 firing it into conduction. When silicon-controlled rectifier 26 starts to conduct, a gating pulse is applied to the gate electrode of silicon-controlled rectifier 44 through capacitor 46 firing it into conduction and shunting resistor 48 of the voltage divider circuit. With the silicon-controlled rectifier many conducting, a low resistance path is provided in order to discharge the capacitor 56 and cause a pulse to be applied to the primary winding 52 of the triggering transformer 54. The transformer 54 accordingly applies a high-voltage pulse to the triggering electrode 22 of the flash tube 14 causing it to fire. With resistor 86 in series with the flash tube 14, energy is dissipated in the resistor 86 and light of minimum intensity is produced by the flash tube 14.

Simultaneously with closing of the switch 40, voltage from the modulation supply circuit 62 is applied through the conducting silicon-controlled rectifier 26 to the timing circuit to charge capacitor 70 at a rate determined by the resistance setting of variable resistor 68. The voltage on capacitor 70 is applied to the emitter of the unijunction transistor 76 and the transistor 76 will be rendered conductive when the voltage across capacitor 70 builds up to the triggering level of the transistor 76. As a result, a positive voltage pulse is applied to the gate electrode of the silicon-controlled rectifier 84, causing the silicon-controlled rectifier 84 to conduct and to shunt the resistor 86 out of the flash tube circuit. Removal of the resistor 86 from the flash tube circuit greatly increases the current flow through the flash tube and increases the intensity of the flash to a high level until the remaining energy in the storage capacitor 24 is consumed. Because the silicon-controlled rectifier 84 is in series with the flash tube 14, the energy from the capacitor 24 is dissipated in the flash tube 14 rather than across the junction of the silicon-controlled rectifier 84.

From the above description, it can be seen with the energy-dissipating in a 86 in the circuit, the flash intensity output from the flash tube PVA, is at a minimum level. However, when the resistor 86 is shunted out of the flash tube circuit by firing of the silicon-controlled rectifier 84 all of the energy from the capacitor 24 is dissipated in the flash tube 14 and the flash intensity is at its maximum level. The total amount of light produced by the flash tube 14 for a given energy charge on the flash storage capacitor 24 is a function of the energy dissipated in the flash tube as compared to the energy dissipated in the resistor 86. Since the time the resistor 86 is in the circuit-dissipating energy is a function of the setting of the timing circuit resistor 68, the amount of light produced by the flash tube 14 in one flash may be regulated through the setting of the resistor 68.

FIGS. 2 to 7 are graphs representing different flashes produced by the photoflash circuit described above with different delay intervals provided by the timing circuit between the firing of the flash tube and the shunting of the resistor 86 by the firing of the silicon-controlled rectifier 84. The different flashes are represented by curves plotted as intensity versus time and integrated accumulated light output versus time. FIGS. 2, 3 and 4 illustrate the variations in the output characteristics taken on a scale of 0.5 microseconds per division with the silicon-controlled rectifier 84 being triggered a relatively short period of time after the flash tube is triggered. FIGS. 5, 6 and 7 illustrate the variations in the output characteristics taken on a scale of 2.0 microseconds with the silicon-controlled rectifier 84 being triggered a relatively long period of time after the flash tube is triggered.

The curves designated A represent the light intensity of the flash tube output plotted versus time. The portions of A curves designated $a$ represent the intensity during the time when the output resistor is in series with the flash tube and the portions of the A curves marked $a'$ represent the intensity during the time when the output resistor is shunted out of the circuit and all of the power is dissipated in the flash tube. The points marked $a''$ represent the instant that the silicon-controlled rectifier 84 is triggered to shunt the output resistor.

The curves marked B represent the integrated accumulated light output plotted versus time. The points $b$ on the B curves correspond to the points $a''$ on the A curves and represent the instant that the silicon-controlled rectifier 84 is triggered. The right-hand side or each graph represents the conditions at the end of the flash represented by the graph. Thus, the magnitude of the B curve at the right-hand side of the graph represents the total amount of light produced by the flash represented by the graph. A comparison of the amplitudes of the B curves will shown that as the delay between the flash tube firing and the firing of the silicon-controlled rectifier 84 is increased, the amount of light produced by the flash is decreased.

The adjustable resistor 68 in mechanically coupled to the focus controls of the associated camera, so that the time required for the triggering of the silicon rectifier 84 and consequently the amount of light output from the flash tube 14 may be made to vary with the camera-to-subject distance. With the subject nearer to the camera, the resistor 68 is made larger so as to increase the interval before the firing of the silicon-controlled rectifier 84 thereby decreasing the flash tube light output. With the subject farther away from the camera, the resistor 68 is made smaller resulting in a decrease in the interval before the triggering of the silicon-controlled rectifier 84 and consequently in a greater light output from the flash tube. When the subject is at a great distance from the camera and maximum light output is required from the flash tube 14, silicon-controlled rectifier 84 is caused to trigger simultaneously with the tube by reducing the value of the resistor 68 to zero. This action immediately shunts the resistor 86 and maximum dissipation of energy in the flash tube results.

The above-described specific embodiment of the invention is only illustrative of the principles of the present invention and may be extensively modified within the scope of the invention. For example, instead of using a silicon-controlled rectifier to shunt the output resistor 86, other types of electronic gating devices can be used. In addition, the invention in its broader aspects does not require the mechanical coupling between the variable resistor 68 and the focus controls of the camera as the system could be designed for the operator to set the value of the resistor 68 independently. Moreover, the invention is not limited to camera applications but can be used in any application requiring a light flash with a controlled energy level such as for example a photocopying application. These an many other modifications may be made to the above-described specific embodiment of the invention without departing from the spirit and scope of the invention, which is defined in the appended claims.

What is claimed is:

1. An electronic flash circuit comprising an electric flash device, means for storing electric energy, means for discharging said energy storing means through said electric flash device for producing a transient flash of light in said flash device, means for dissipating a portion of said energy and limiting the intensity of said flash light and control means for disabling said dissipating means from dissipating energy after a delay interval following the start of said flash of light and increasing the intensity of said flash of light.

2. The electronic flash circuit of claim 1 wherein said dissipating means comprises a resistor connected in series with said flash device.

3. The electronic flash circuit of claim 2 wherein said control means comprises means for shunting said resistor after said delay interval thereby disabling said dissipating means.

4. The electronic flash circuit of claim 3 wherein said control means further comprises a timing circuit for determining said delay interval and wherein said shunting means is an electronic switching device which is triggered to its conducting state in order to shunt said resistor in response to a signal from said timing circuit after said delay interval.

5. The electronic flash circuit of claim 4 wherein said electronic switching device is a silicon-controlled rectifier.

6. The electronic flash circuit of claim 4 wherein said timing circuit includes a unijunction transistor adapted to be triggered after said delay interval in order to apply said signal to said electronic switching device.

7. The electronic flash circuit of claim 4 wherein said timing circuit comprises a capacitor, means for charging said capacitor and means for applying said signal to said electronic switching device when said capacitor has been charged to a predetermined level in order to trigger said electronic switching device into its conducting state.

8. The electronic flash circuit of claim 7 wherein said timing circuit includes means for varying the charging time of said capacitor.

9. The electronic flash circuit of claim 8 wherein said means for varying the charging time of said capacitor comprises a variable resistor and further including a camera having a variable focus setting and operably associated with said variable resistor whereby the resistance of said variable resistor is controlled in accordance with the focus setting of said camera.

10. The electronic flash circuit of claim 7 wherein said means for charging said capacitor comprises a capacitor 19 a voltage control device for regulating the voltage across said last-mentioned capacitor.

ii. An electronic flash circuit comprising a flash tube operable to emit a transcient flash of light when triggered, a resistor connected in series with said flash tube, means for applying a voltage across said series connected resistor and flash tube and circuit means operable for selectively triggering said flash tube and shunting said resistor.

12. An electronic flash circuit as recited in claim 11 wherein said circuit means is operable to shunt said resistor a delay interval after the triggering of said flash tube.

13. An electronic flash circuit comprising a storage capacitor, means for charging said storage capacitor, a flash tube operable to generate a transient flash of light in response to the triggering thereof, circuit means including a resistor for connecting said flash tube to said capacitor so as to provide a discharge path therefor, and means for triggering said flash tube and generating a flash by discharging said capacitor through said flash tube, said circuit means connecting said flash tube in series with said resistor in said discharge path for part of the discharge of said capacitor to generate low-intensity light and removing said resistor from said discharge path for the remainder of the discharge of said capacitor through said flash tube to generate high-intensity light with said flash tube.

14. Circuitry for controlling the light output of a flash camera including, in combination: 25 6,
- an energy storage capacitor adapted to receive a charging current from a source of supply voltage for charging up to a predetermined voltage level,
- a flash tube connected to said capacitor for receiving energy therefrom to provide a desired maximum light output from the flash tube, and
- variable impedance means connected in series with said flash tube and in the discharge path of said capacitor for controlling the discharge current through said flash tube and thereby controlling the light output from said flash tube in accordance with a preselected distance between said flash tube and subject.

15. In a timing circuit for a flash camera of the type having an energy storage capacitor connected in parallel with a flash tube for providing a discharge current therethrough for energizing said flash tube, the improvement comprising a variable impedance means connected in series with said flashtube and adjustable to a value consistent with the desired discharging current through said flashtube and the desired light output thereof.

16. A method for varying the light output of the flash tube of a flash camera which comprises the steps of:
- connecting a variable impedance in series with the flash tube to limit the discharge current therethrough, and
- adjusting the value of said impedance to limit said discharging current through the flash tube to a level which produces a preselected light output of the flash tube in accordance with the distance between flash camera and subject.

* * * * *